UNITED STATES PATENT OFFICE.

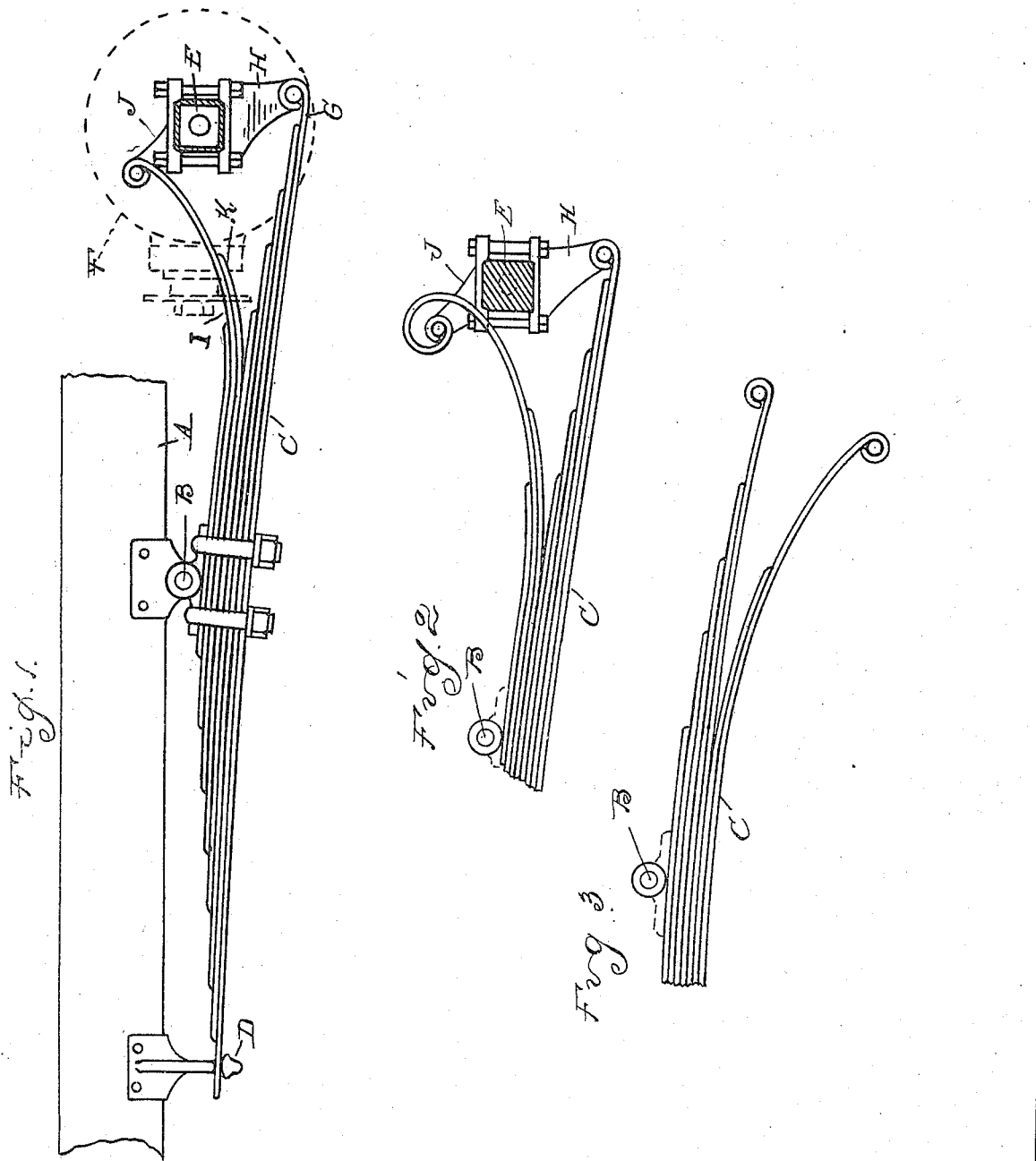

CHARLES B. KING, OF DETROIT, MICHIGAN.

VEHICLE-SPRING.

1,186,583.   Specification of Letters Patent.   Patented June 13, 1916.

Application filed March 15, 1915. Serial No. 14,498.

*To all whom it may concern:*

Be it known that I, CHARLES B. KING, a citizen of the United States of America, residing at Detroit, in the county of Wayne and State of Michigan, have invented certain new and useful Improvements in Vehicle-Springs, of which the following is a specification, reference being had therein to the accompanying drawings.

The invention relates to vehicle spring suspensions of the cantaliver type, and it is the primary object of the invention to make provision for the carrying of stresses due to the torque and longitudinal thrust of the axle as well as those arising from the load.

In the drawings Figure 1 shows my improved spring, and Figs. 2 and 3 show modifications.

A is the side sill of the vehicle frame to be supported, B is the pivot or fulcrum bearing for a cantaliver spring C, and D is an anchor bearing for the inner end of the cantaliver.

E is the axle and F indicates in dotted line the housing for the differential gearing, through which power is transmitted from the forwardly-extending propeller shaft (not shown).

In general construction the cantaliver spring C is formed from a series of spring levers progressively decreasing in length from bottom to top. Such a construction is well designed to carry the gravity load upon the vehicle frame to the point of suspension, which is at the outer end of the lower spring leaf. If, however, there are in addition to the stresses due to weight, other stresses due to the torque of the axle and the forward propulsion, the construction thus far described is not as well adapted to take care of these stresses. I have therefore modified the construction of the cantaliver spring so as to yieldably brace the same from deflection due to the torque of the axle, and also to transmit the longitudinal thrust thereinto without in any way interfering with the freedom of movement of the cantaliver under gravity stresses and vertical oscillations due to the irregularities in the road bed. As shown, this result is accomplished by attaching the outer end of the lower leaf G to a bracket H depending from the axle, and by deflecting one of the superposed leaves, such as I, and attaching it to a bearing on a bracket J separated from the point of attachment to the bracket H. This will form a brace or trussed connection for resisting torsional stresses and for also carrying the longitudinal thrust into the body of the cantaliver. It is not, however, desirable to provide absolute rigidity in this bracing connection and I therefore preferably curve the leaf I so that it will slightly yield and cushion the torque stresses as well as the other stresses imparted to the spring.

As specifically shown, the leaf I is reinforced by an under leaf K, which is also deflected from the general curvature of the spring, while the lower leaf G is reinforced by a series of progressively shortening leaves before reaching the point of juncture with the leaf I.

While I show in Fig. 1 the spring applied to an axle having a housing in which a live shaft is used it may be applied to a dead rear axle where the wheels are individually driven independent of said axle, such a construction being indicated in Fig. 2.

What I claim as my invention is:—

1. The combination with a vehicle frame and drive axle, of a cantaliver spring for supporting said frame upon said drive axle, comprising a substantially straight connection between said frame and axle, and a curved brace connection between said spring and axle for resiliently and yieldably resisting the axle torque.

2. The combination with a vehicle frame and drive axle, of a cantaliver spring for supporting said frame upon said drive axle, said spring comprising a substantially straight portion connected to said axle at one side thereof and a curved portion diverging from said substantially straight portion and connected to said axle at the opposite side thereof, said curved portion resiliently and yieldably resisting the axle torque.

3. The combination with a vehicle frame and drive axle, of a cantaliver spring for supporting said frame upon said drive axle, said spring comprising a plurality of substantially straight leaves, one of which being connected to said drive at one side thereof, and a plurality of leaves diverging from said substantially straight parallel leaves, one of which being connected to said drive axle at the opposite side thereof, the last mentioned leaves being curved to resiliently and yieldably resist the axle torque.

In testimony whereof I affix my signature in presence of two witnesses.

CHARLES B. KING.

Witnesses:
JAMES P. BARRY,
ARTHUR D. PULVER.

Copies of this patent may be obtained for five cents each, by addressing the "Commissioner of Patents Washington, D. C."